Nov. 5, 1957 M. SCHWARTZ ET AL 2,811,845
B-C PHOTOFLASH UNIT.
Original Filed June 9, 1950 2 Sheets-Sheet 1
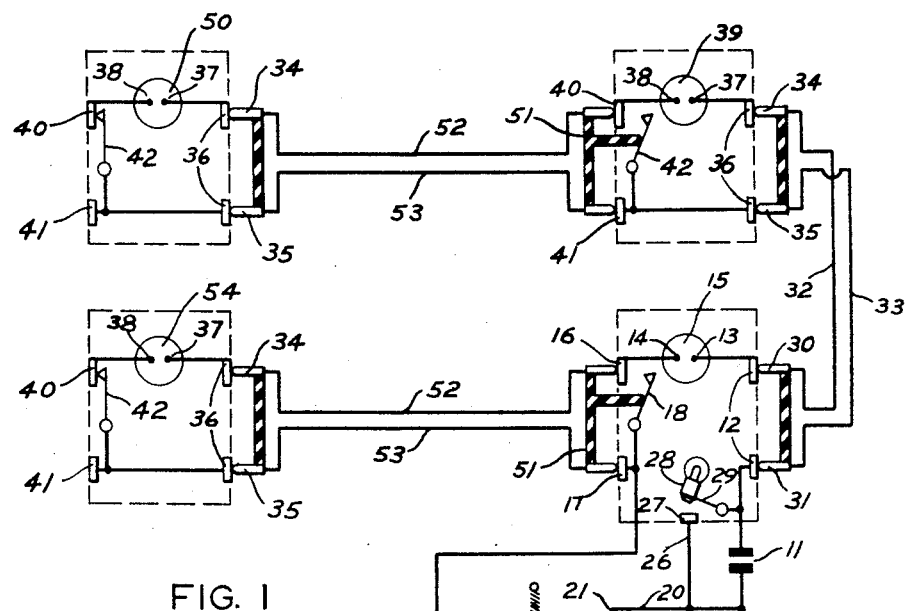
FIG. 1
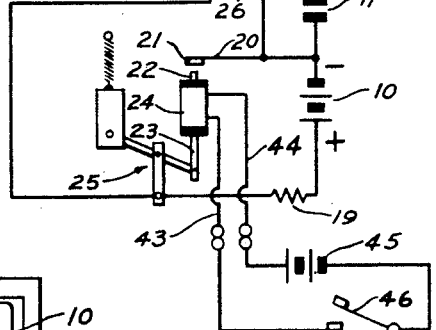
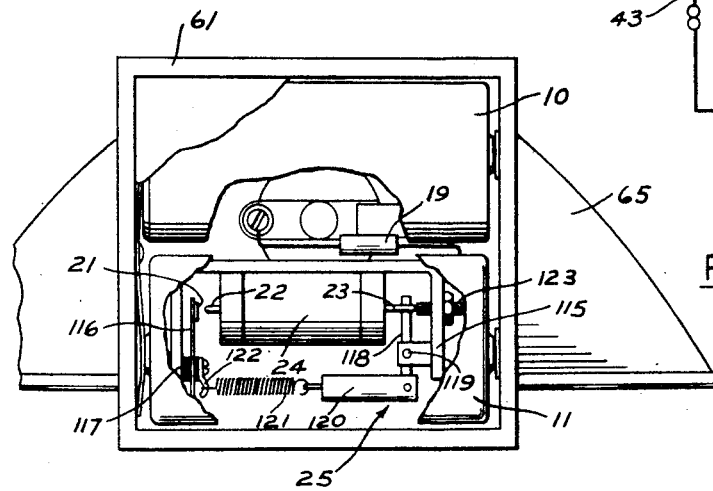
FIG. 8
INVENTORS
MORRIS SCHWARTZ
WILLIAM CASTEDELLO
BY
ATTORNEY Nov. 5, 1957  M. SCHWARTZ ET AL  2,811,845
B-C PHOTOFLASH UNIT
Original Filed June 9, 1950  2 Sheets-Sheet 2
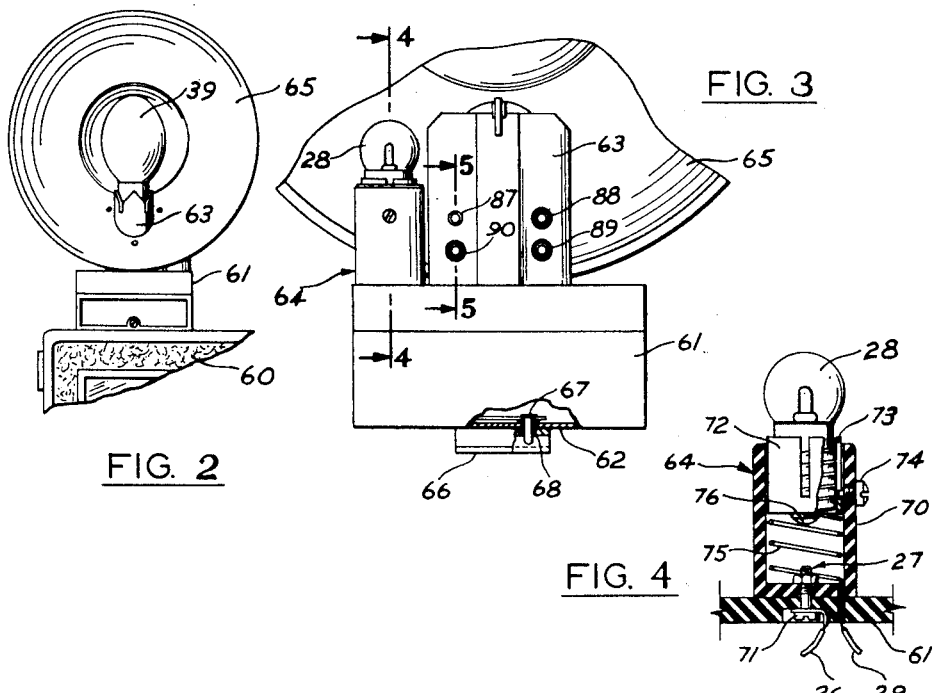
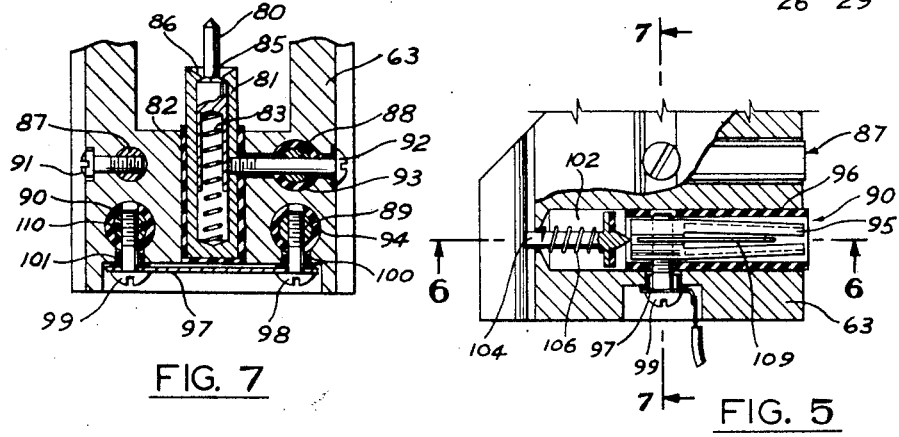
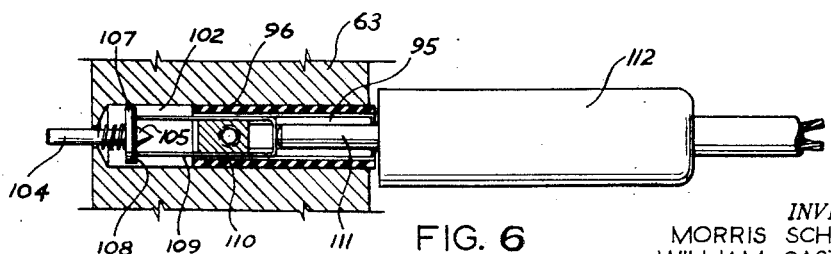
INVENTORS
MORRIS SCHWARTZ
WILLIAM CASTEDELLO
BY
*Frederick E. Hains*
ATTORNEY

United States Patent Office 2,811,845
Patented Nov. 5, 1957

2,811,845

B–C PHOTOFLASH UNIT

Morris Schwartz and William Castedello, Plainville, Conn., assignors to The Kalart Company, Inc., Plainville, Conn.

Original application June 9, 1950, Serial No. 167,102, now Patent No. 2,638,764, dated May 19, 1953. Divided and this application March 12, 1953, Serial No. 341,902

6 Claims. (Cl. 67—31)

This invention relates to photoflash equipment, particularly to flash equipment and circuit systems for such equipment employing a plurality of flash bulbs which are to be simultaneously fired.

Multiple flash equipment of the general type, above referred to, is frequently used to illuminate a large area or to obtain a desired distribution of light. The manufacture of equipment of this type entails certain difficulties. Foremost among these are, to secure simultaneous firing of all the bulbs in synchronism with the shutter operation of the camera; to maintain a comparatively low weight of the entire equipment; and to avoid the necessity of frequently replacing the batteries usually employed as source of current.

With conventional equipment, the batteries are frequently discarded after relatively short use merely due to a slight drop of the initial voltage as a result of which the batteries are no longer capable of operating a solenoid and flashing a number of flash bulbs. In other words, the amount of energy in a standard battery is too critical to permit prolonged efficient service.

Accordingly, among the principal objects of the invention is to provide a multiple flash equipment which permits firing of all the bulbs at exactly the same time, which has a comparatively low weight, and which does not require a frequent replacement of the batteries.

Another object of the invention is to provide a multiple flash equipment of the general type, above referred to, which permits to hook up and fire simultaneously, within reasonable limits, any desired number of bulbs.

Another object of the invention is to provide a multiple flash equipment that requires only a single battery or other source of current for firing a plurality of flash bulbs.

Another object of the invention is to provide a circuit system for multiple flash equipment which greatly reduces drain from the battery thereby extending the lifetime of the same.

Another important object of the invention, allied with the preceding one, is a circuit system in which a measured quantity of energy just sufficient for one energization of the system is transferred to a capacitance means from which it is discharged for the purpose of firing the flash bulbs. In other words, the entire energy of a battery is transferred in uniform doses to the capacitance means so that the energy of a battery can be used to a much higher degree than was hitherto possible.

Another object of the invention is to provide switch means for operating the multiple flash equipment which switch means are protected against being closed by an impact or jar thereby avoiding accidental firing of the flash bulbs.

The present application is a divisional application based upon our copending application Ser. No. 167,102, filed June 9, 1950, now issued as Patent 2,638,764 on May 19, 1953.

Other and further objects, features and advantages of the invention will be pointed out hereinafter and set forth in the appended claims forming part of the application.

In the accompanying drawing a preferred embodiment of the invention is shown by way of illustration and not by way of limitation.

In the drawing:

Fig. 1 is a typical circuit system for a multiple photoflash equipment according to the invention.

Fig. 2 is a front view of one of the flash units of the equipment, more particularly of the so-called "master unit."

Fig. 3 is a fragmentary rear view of the master unit.

Fig. 4 is a sectional view of the switch means of a test circuit forming part of the circuit system.

Fig. 5 is a section taken on line 5—5 of Fig. 3.

Fig. 6 is a section taken on line 6—6 of Fig. 5.

Fig. 7 is a section taken on line 7—7 of Fig. 5, and

Fig. 8 is an enlarged bottom view of Fig. 3, the cover of the casing of the unit according to Fig. 3 being removed to show the parts housed within the casing.

Broadly speaking, the present invention relates to flash equipment of the type in which a plurality of photoflash bulbs are to be simultaneously fired by discharging a previously charged capacitor through the primers of the bulbs. The discharge of the capacitor is controlled by switch means the actuation of which is coupled with the operation of the shutter release means and the synchronizer or timing device, generally used in connection with flash work.

Referring now in detail first to Fig. 1, the circuit system according to this figure shows a D.-C. source of current such as battery 10 connected in a closed series circuit with a capacitor 11, contacts 12, the terminals 13 and 14 of a socket for a flush bulb 15, contacts 16 and 17 which are shown open but for the time being shall be assumed to be closed by a switch member 18, and a high resistor 19. Battery 10 and resistor 19 are shunted by a by-pass circuit including a lead 20, a contact 21, a contact 22, a moveable core 23 of a relay 24, and a linkage system generally designated by 25. The capacitor 11 is shunted by a test circuit including a lead 26, a contact 27, a test bulb 28 shown as a light bulb of the flashlight type, and a lead 29. The shunt circuits are both normally open and are assumed to be open for the time being. Contacts 12 are connected by contact elements 30 and 31, wires 32 and 33, contact elements 34 and 35 to contacts 36 which are connected in series with the terminals 37 and 38 of a socket for a second photoflash bulb 39, and contacts 40 and 41 which for the time being are assumed to be closed by a switch member 42 though shown open.

The coil of relay 24 is connected by leads 43 and 44 to a source of current shown as a battery 45 through the normally open contacts of a switch 46.

Battery 45 may be disposed in the casing of a camera and also serve to operate the camera shutter and other electrically operate devices associated with the camera. It may also be disposed in a battery casing. The battery can be physically separated from the components of the flash assembly proper and be connected with the relay coil through wire connections. Switch 46 should be visualized as being electrically or mechanically coupled with the release means of the camera shutter and the synchronizer so that closing of switch 46 also effects tripping of the shutter and actuation of the synchronizer.

The voltage of a battery 10, the resistance of resistor 19, and the capacitance of capacitor 11 must be selected in accordance with the requirements of a specific application. Practical tests have shown that in many instances a voltage of about 22.5 volt, a resistance value of 2000 ohm and a capacitance of 250 mf. give satisfactory results.

The function of the circuit system, as hereinbefore described, is as follows:

Let it be assumed that photoflash bulbs are inserted in the two sockets, that contacts 16, 17 and 40, 41 respectively are closed, and that both the shunt circuits are open. Then, capacitor 11 will be charged from battery 10, the high resistance value of resistor 19 preventing a short circuit of the battery and a discharge of the capacitor through the closed series circuit sufficient to cause firing of the flash bulbs.

It will be noted that capacitor 11 can only be charged if all the circuit connections and also flash bulbs are in proper working condition by reason of the series connection of the entire circuit system. In order to test the condition of the circuit system, the test circuit is closed by moving the respective terminal of test bulb 28 into engagement with contact 27. Closing of the test circuit causes capacitor 11 to discharge through the filament of the test bulb which will flicker or flash for a brief moment thereby indicating satisfactory condition of the main circuit. If desired, the test bulb can be flashed several times to make certain that the circuit system did not become defective with the capacitor still charged.

The circuit is now ready for firing of the photoflash bulbs. This is accomplished by closing switch 46 causing relay 24 to become energized. As will be evident, energization of the relay effects closing of contacts 21 and 22 by the attraction of core 23. Battery 10 and resistor 19 are now short-circuited through lead 20, contacts 21, 22, and core 23. As a result, the capacitor will discharge through the primers of the flash bulb with a current flow sufficient to cause firing of the bulbs.

In this connection it should be noted that the purpose of resistor 19 is merely to control the voltage and current conditions of the system and that the necessary resistance value of the system may be provided by any suitable means other than a separate resistor.

In the previous description, the flash assembly has been described as comprising a master unit including flash bulb 15 and the associated control components and one slave unit including flash bulb 39. If it now be desired to add a second slave unit including a photoflash bulb 50, this unit is connected by a connector 51 having two contacts and leads 52 and 53 to the first slave unit. As will be noted, the two contact elements engage contacts 40 and 41. The connector is so arranged that connection of connector 51 to contacts 40 and 41 forces switch member 42 into the open position (as shown on Fig. 1). The structural arrangement of the connector will be more fully explained hereinafter.

The second slave unit is identical with the first one in that its leads 52 and 53 are connected to a connector having contact elements 34 and 35 engaging contacts 36. Contacts 40 and 41 are again bridged by a normally closed switch member 42. As will be evident, flash bulb 50 and all the components of the second slave unit are connected in series between contacts 40 and 41 of the first slave unit and are, hence, in series with the entire system. Consequently, bulb 50 and the circuit connections thereof can be tested in the same manner as previously described and the flash bulb 50 will also be fired by closing switch 46.

The chain of slave units can be continued by connecting a third identical slave unit to contacts 40 and 41 of the second unit causing opening of switch member 42 thereof in the same manner as previously described.

A second slave chain can be connected to the master unit by connecting the first unit of the second chain to the contacts 16 and 17 and opening switch member 18. The illustrated slave unit of the second chain is shown as comprising a photoflash bulb 54.

As will be noted, the slave unit including bulb 54 is also connected in series with the entire system when contacts 16 and 17 are open.

If desired, contact connections for additional slave chains may be provided at the master unit.

Referring now to the structural arrangement of the master unit and the slave units, Fig. 2 shows a general view of the master unit electrically and mechanically connected to a camera 60. The master unit is exemplified as comprising a casing 61 closed at the bottom by a removable cover 62. The casing houses battery 10, capacitor 11, relay 24, resistor 19 and the contacts and wire connections associated with the aforesaid components. The top of the casing supports a socket 63 for the photoflash bulb and a socket generally designated by 64 for test bulb 28 of the test circuit. Socket 63 supports a reflector 65 and may or may not be equipped with a bulb ejector. For purpose of mechanically and electrically connecting the master unit to the camera, a contact shoe 66 is secured to casing bottom 62. This shoe constitutes one terminal. The second terminal is formed by a spring supported contact pin 67 insulated from the contact shoe by an insulation sleeve 68. Terminals 66 and 67 are connected to leads 43 and 44 of Fig. 1. The contact shoe and pin 67 fit and engage corresponding guide tracks and contacts on the camera casing 60 to establish connection with battery 45 and switch 46. It will, of course, be understood that the contact shoe may also be fitted upon the head of a battery case and that the contact connections between the master unit and battery 45 may be established by any other suitable connecting means.

Socket 64 of the test bulb comprises an insulation sleeve 70 secured to casing 61 by any suitable means such as a screw 71 which also forms the center terminal of the socket. Sleeve 70 houses a metal sleeve 72 having slots 73 giving sleeve 72 a certain springiness. One of the slots is engaged by a screw 74 to retain sleeve 72 within sleeve 70 against the action of a metal spring 75. This spring abuts with its upper end against sleeve 72 and is connected to wire 29. As a result, sleeve 72 forms the second terminal of the socket. As will be evident, a test bulb 28 received frictionally in sleeve 72 is biased into the position shown in Fig. 4. By axial downward pressure exerted upon the globe of the bulb, the base terminal 76 thereof can be moved into contact with center terminal screw 71 thereby closing the test circuit across the electrodes of capacitor 11. Upon release of the bulb the same will snap back into the position shown in Fig. 4.

Socket 63 for photoflash bulb 39 is shown as having a metal body the upper portion of which forms the outer terminal for the flash bulb, as can best be seen on Fig. 2. The center terminal for the base terminal of the flash bulb is formed by a pin 80 disposed axially slideably in a metal sleeve 81 closed at the bottom and electrically insulated from the outer socket body by a sleeve 82. Contact pin 80 is biased into the position shown in Fig. 7 by a spring 83 abutting with its lower end against the bottom of sleeve 81 and with its upper end against the bottom of a bore in pin 80. The pin is set off to form a shoulder 85 abutting against a construction 86 of sleeve 81 to retain pin 80 within sleeve 81.

For the purpose of forming the contacts and switches represented on Fig. 1 by numerals 12, 16 and 17, four female contact elements 87, 88, 89 and 90 are fitted into the socket body 63. All four contact elements comprise slotted sleeves adapted to receive frictionally the male contact elements indicated on Fig. 1, for instance by numerals 30 and 31.

Contact element 87 is held in position by a screw 91 and is in direct electric contact with socket body 63 thus connecting the outer terminal of the socket with the circuit system. As will be appreciated, contact element 87 corresponds in effect to contact 16 of Fig. 1. Contact element 88 is held in position and electrically connected with sleeve 81 by a screw 92 thereby connecting the center terminal of the flash bulb socket to the circuit system. In other words, contact element 88 corresponds to the upper contact 12 of Fig. 1. Contact element 88 is insulated from the socket body 63 by an insulation sleeve 93 as is also screw 92. Contact element 89 corresponds to the lower contact 12 of Fig. 1 and is insulated from the socket body 63 by an insulation sleeve 94.

Contact element 90 corresponds to contact 17 of Fig. 1, and is associated with the switch arrangement represented in Fig. 1 by the switch member 18. Contact element 90 comprises a slotted metal sleeve 95 which is insulated from socket body 63 by an insulation sleeve 96. Contact sleeve 95 is electrically connected with contact element 89. This connection is shown as a metal bar 97 secured to contact elements 89 and 90 by screws 98 and 99 also serving to hold these contact elements in position within their respective bores within socket body 63. Metal bar 97 is insulated from the socket body by insulation bushings 100 and 101.

In this connection it should be noted that in the master unit the electric connection between contact elements 89 and 90 can and preferably is effected by wire connections rather than by the metal bar just described. The use of such metal bar is more advantageous for the slave units. However, for sake of simplicity of illustration, a metal bar has been shown since the feature essential for the understanding of the invention is merely the electric connections of the contact elements.

As can best be seen on Figs. 5 and 6, a bore 102 for sleeves 95 and 96 is transversely extended through the entire socket body 63 and narrowed at the end opposite to the receiving end thereof. The narrowed end of bore 102 guides a metal pin 104 which is in electric contact with socket body 63 and has at its inner end preferably a pointed portion 105. A spring 106 abuts at one end against the narrow end of bore 102 and at the other end against a disc 107 fixed to pin 104. As a result, pin point 105 is biased into the position shown in Fig. 5 in which it engages sleeve 95. As a result, sleeve 95 is electrically connected with socket body 63 through pin 104. Disc 107 supports on its side facing sleeve 95 an insulation disc 108 which coacts with a U-shaped wire 109 axially slideable in grooves 110 in the outer wall of sleeve 95. The cross branch of this wire is adapted to be engaged by the contact pole 111 of a male plug 112 inserted in sleeve 95. As can best be seen on Fig. 6, insertion of the plug displaces wire 109 and pin 104 so that point 105 of pin 104 is forced away from sleeve 95. In other words, contact element 90 and, hence, also contact element 89 are now disconnected from the socket terminal 63. Upon withdrawal of the plug, pin point 105 returns into engagement with sleeve 95.

Reverting now to Fig. 1, it will be appreciated that insertion of the two male pole elements of a plug into contact elements 87 and 90 establishes circuit connections as are shown in Fig. 1 for the flash bulb 54, that is, switch member 18 is open and flash bulb 54 is connected in series with the entire system.

It will further be appreciated that each of the slave units is equipped with four contact elements and a switch arrangement as described in connection with the master unit. The only difference between the master units and the slave units is that the latter do not have casing 61 with the components housed therein. The socket bodies 63 of the slave units can be supported in any suitable manner, for instance, the socket bodies may have a threaded hole with which the sockets can be screwed upon a tripod. The test bulb of test circuit is generally associated with the master unit but it is also conceivable that it is physically associated with one of the slave units.

The arrangement of relay 24 and of the elements associated therewith within casing 61 are clearly shown in Fig. 8. According to this figure, the coil of the relay is fastened to a metal frame 115 which in turn is mounted within housing 61. One end of core 23 which is axially slidable within the coil forms the contact 22 coacting with contact 21 supported by a spring 116 which in turn is secured to frame 115 insulated therefrom by an insulation block 117. The end of core 23 opposite to contact point 22 is bi-furcated to receive one arm of a two-arm lever 118 pivoted at 119 to frame 115. The other arm of lever 118 is pivoted to one end of a weight element 120. The other end of weight 120 is attached to a loaded spring 121 which is also secured to frame 115 by a hook 122 or other suitable means.

The purpose of the arrangement, just described, is to prevent contacts 21 and 22 to engage each other accidentally as a result of an impact or jar causing core 23 to slide within the coil. As will be obvious, spring 121 is holding the core in a position in which the contacts are separated until the relay coil is energized by closing switch 46. A screw 123 serves to adjust the distance between contacts 21 and 22 and, hence, the period of time required for closing the release circuit for the flash bulbs after operation of switch 46.

While the invention has been described in detail with respect to a certain now preferred example and embodiment of the invention it will be understood by those skilled in the art after understanding the invention, that various changes and modifications may be made without departing from the spirit and scope of the invention and it is intended, therefore, to cover all such changes and modifications in the appended claims.

What is claimed as new and desired to be secured by Letters Patent is:

1. A multiple battery-capacitor photoflash assembly comprising, in combination, a master unit including a housing, a flash lamp socket mounted on the housing and self-closing connector means, said connector means comprising two fixed socket terminals connected in series with said lamp socket, a movable contact element disposed axially slidable in alignment with one of the socket terminals of the self-closing connector means and fixedly connected to the other socket terminal, an insulation disc supported on said contact element, said contact element having a portion protruding from said disc, said protruding portion being biased into contact with the respective socket terminal and spring means biasing said contact element into engagement with the respective socket terminal to bridge the two socket terminals; and a slave unit including a flash lamp socket, a connecting cord ending in a plug having two pole elements insertable in said socket terminals of the master unit, and a switch control element disposed axially slidable within the socket terminal aligned with the movable contact element, said switch control element being movable by insertion of the respective pole of the plug into engagement with said contact element for moving the latter into the position disengaged from the respective socket terminal thereby opening said bridge and connecting in series the flash sockets of the master unit and the slave unit, electromagnetic switch means for controlling flash circuit means including said flash socket of the master unit, the said switch means being mounted within the housing and including a stationary contact and a movable contact biased into a position disengaged from the stationary contact, a core coacting with said movable contact for moving the same into engagement with the stationary contact upon energization of the electromagnetic switch means, and spring means operatively connected with said core yieldably retaining the same in a position in which the said contacts are disengaged one from the other.

2. A photoflash assembly as described in claim 1, wherein the said moveable contact is structurally united with said core, and wherein said spring means bias the core into a position in which the said contacts of the electromagnetic switch means are disengaged.

3. A photoflash assembly as described in claim 2, wherein the said stationary contact is spring supported, and wherein adjustment means are provided for varying the distance between the said two contacts.

4. A photoflash assembly as described in claim 3, wherein a frame supports said electromagnetic switch means, the contacts thereof and the spring means, and wherein said support frame constitutes part of said circuit means.

5. A photoflash assembly as described in claim 4, wherein said spring means are disposed parallel to the coil and the core of the electromagnetic switch means, one end of the spring means being secured to the frame, and wherein a pivotally mounted two-arm lever is connected with one arm to the other end of the spring means and with the other arm to the end of the core opposite to the said moveable contact of the electromagnetic switch means.

6. A multiple battery-capacitor photoflash assembly comprising, in combination, a master unit including a housing, a flash lamp socket mounted on the housing and self-closing connector means, said connector means comprising two fixed socket terminals connected in series with said lamp socket, a movable contact element disposed axially slidable in alignment with one of the socket terminals of the self-closing connector means and fixedly connected to the other socket terminal, an insulation disc supported on said contact element, said contact element having a portion protruding from said disc, said protruding portion being biased into contact with the respective socket terminal, and spring means biasing said contact element into engagement with the respective socket terminal to bridge the two socket terminals; and a slave unit including a flash lamp socket, a connecting cord ending in a plug having two pole elements insertable in said socket terminals of the master unit, and a switch control element disposed axially slidable within the socket terminal aligned with the movable contact element, said switch control element abutting against said disc and being movable by insertion of the respective pole of the plug to displace said disc for moving the protruding portion of the contact element into the position disengaged from the respective socket terminal thereby opening said bridge and connecting in series the flash sockets of the master unit and the slave unit.

References Cited in the file of this patent
UNITED STATES PATENTS

| | | |
|---|---|---|
| 1,632,788 | Diener | June 21, 1927 |
| 1,999,278 | Britten | Apr. 30, 1935 |
| 2,467,591 | Lidfeldt | Apr. 19, 1949 |
| 2,584,858 | Fritz | Feb. 5, 1952 |
| 2,638,764 | Schwartz | May 19, 1953 |
| 2,646,672 | Fairbank | July 28, 1953 |